(12) United States Patent  
McKeon

(10) Patent No.: US 6,174,009 B1  
(45) Date of Patent: Jan. 16, 2001

(54) BUMPER CONSTRUCTION INCLUDING SELF-ORIENTING SUPPORT TOWERS PROVIDING CONSISTENT ENERGY ABSORPTION ON IMPACT

(75) Inventor: R. Clayton McKeon, Holland, MI (US)

(73) Assignee: Shape Corporation, Grand Haven, MI (US)

(*) Notice: Under 35 U.S.C. 154(b), the term of this patent shall be extended for 0 days.

(21) Appl. No.: 09/169,722

(22) Filed: Oct. 9, 1998

(51) Int. Cl.[7] .................................................. B60R 19/34
(52) U.S. Cl. ........................ 293/133; 293/155; 188/377
(58) Field of Search ................................... 293/155, 154, 293/133, 132; 188/371, 377

(56) References Cited

U.S. PATENT DOCUMENTS

| 3,437,367 | 4/1969 | Blank . | |
|---|---|---|---|
| 3,754,784 | 8/1973 | Heinig et al. . | |
| 3,773,373 | 11/1973 | McLauchlan . | |
| 3,850,466 | 11/1974 | Yepis . | |
| 3,880,455 | * 4/1975 | Toemmeraas | 293/99 |
| 3,912,295 | 10/1975 | Eggert, Jr. . | |
| 4,079,975 | * 3/1978 | Matsuzaki et al. | 293/98 |
| 4,182,529 | * 1/1980 | Taylor | 293/132 |
| 4,272,114 | * 6/1981 | Hirano et al. | 293/133 |
| 4,465,312 | 8/1984 | Werner . | |
| 4,829,979 | 5/1989 | Moir . | |
| 4,830,418 | * 5/1989 | Gest | 293/134 |
| 4,974,891 | 12/1990 | Furuta . | |
| 4,976,481 | * 12/1990 | Yoshihira | 293/133 |
| 5,080,412 | 1/1992 | Stewart et al. . | |
| 5,201,558 | 4/1993 | Thum . | |
| 5,314,229 | 5/1994 | Matuzawa et al. . | |
| 5,584,518 | 12/1996 | Frank et al. . | |
| 5,785,367 | 7/1998 | Baumann et al. . | |
| 5,803,514 | 9/1998 | Shibuya et al. . | |

FOREIGN PATENT DOCUMENTS

| 4401865A1 | 8/1994 | (DE) . | |
|---|---|---|---|
| 289397 | 11/1988 | (EP) . | |
| 1107344 | * 12/1955 | (FR) | 293/155 |
| 213611 | 6/1924 | (GB) . | |
| 740563 | 6/1980 | (SU) . | |

* cited by examiner

Primary Examiner—Joseph D. Pape  
(74) Attorney, Agent, or Firm—Price, Heneveld, Cooper, DeWitt & Litton

(57) ABSTRACT

A bumper construction for a vehicle includes a swept tubular bumper beam having a pair of spaced-apart brackets and a pair of towers configured to attach to the brackets and support the bumper beam on a vehicle. The towers each include a platform configured for attachment to one of the brackets, and further include an elongated portion configured for connection to the vehicle. A swivel connection connects the tower to the bumper beam. The connection includes a protruding section on one of the bracket and the tower, and a socket receiving the protruding section on the other of the bracket and the tower. The protruding section and the socket are configured to draw the tower toward an impacting force during a catastrophic impact, such that the tower is more likely to crush with a high-energy absorbing, accordion-like collapse (as opposed to a low-energy absorbing parallelogram-like collapse).

28 Claims, 7 Drawing Sheets

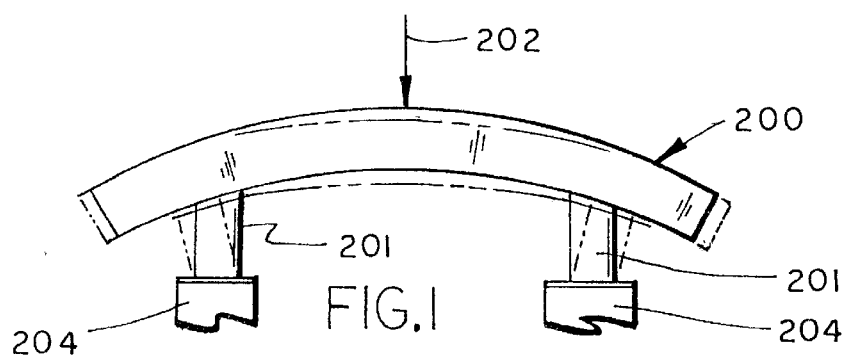
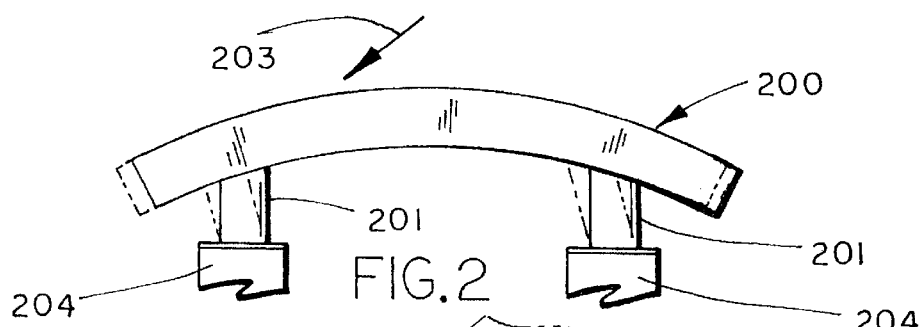
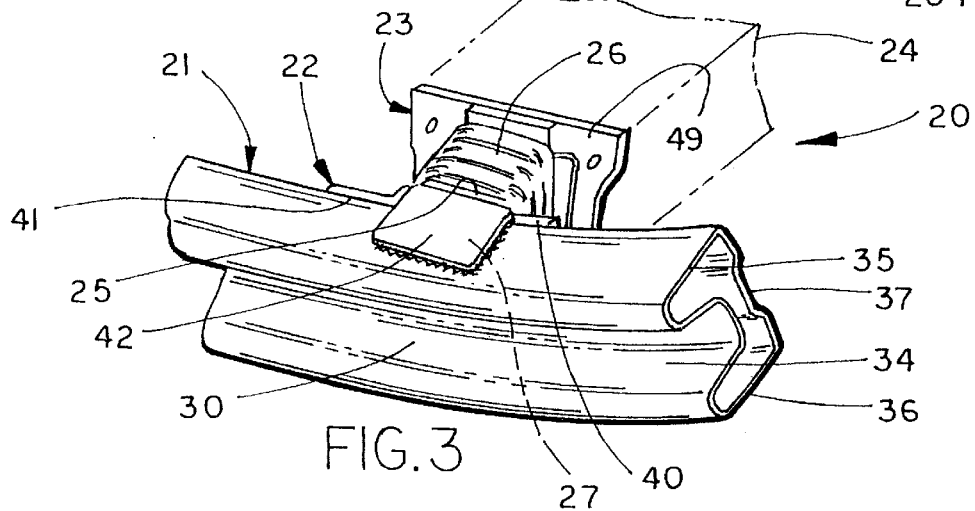
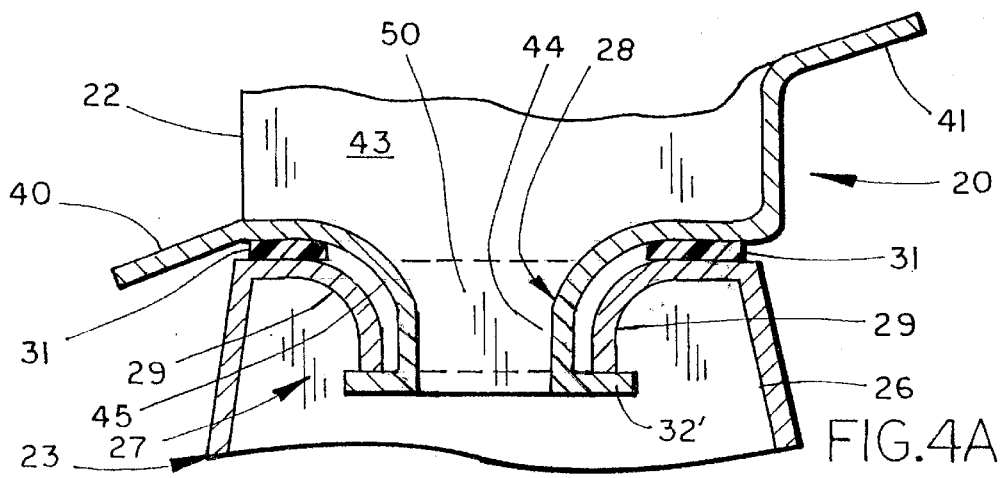

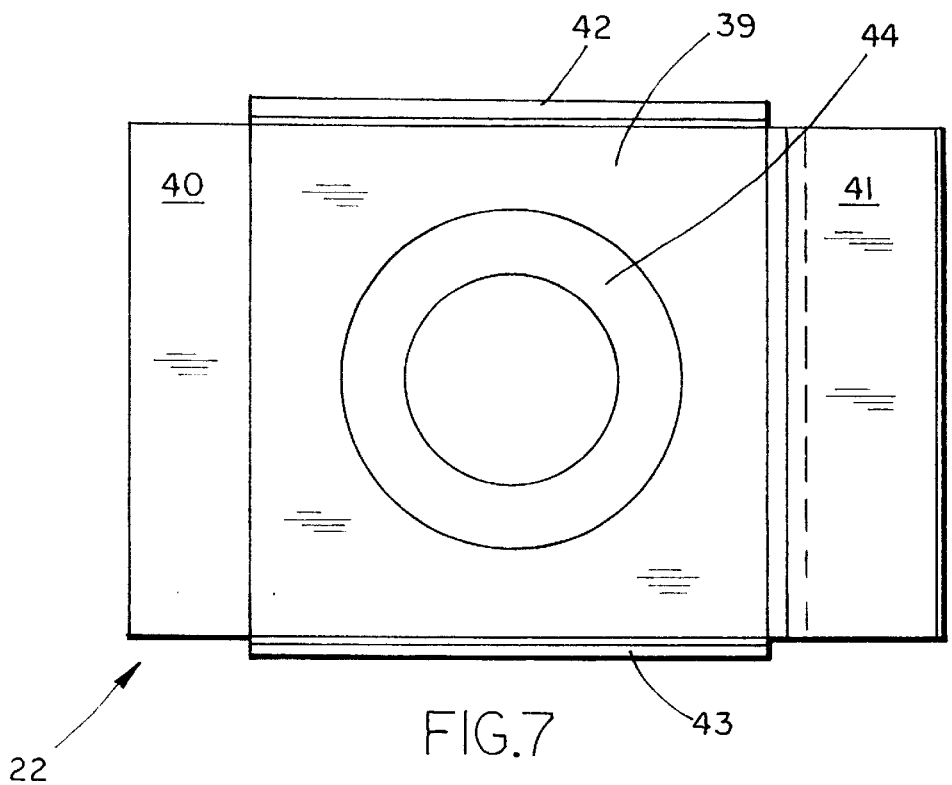
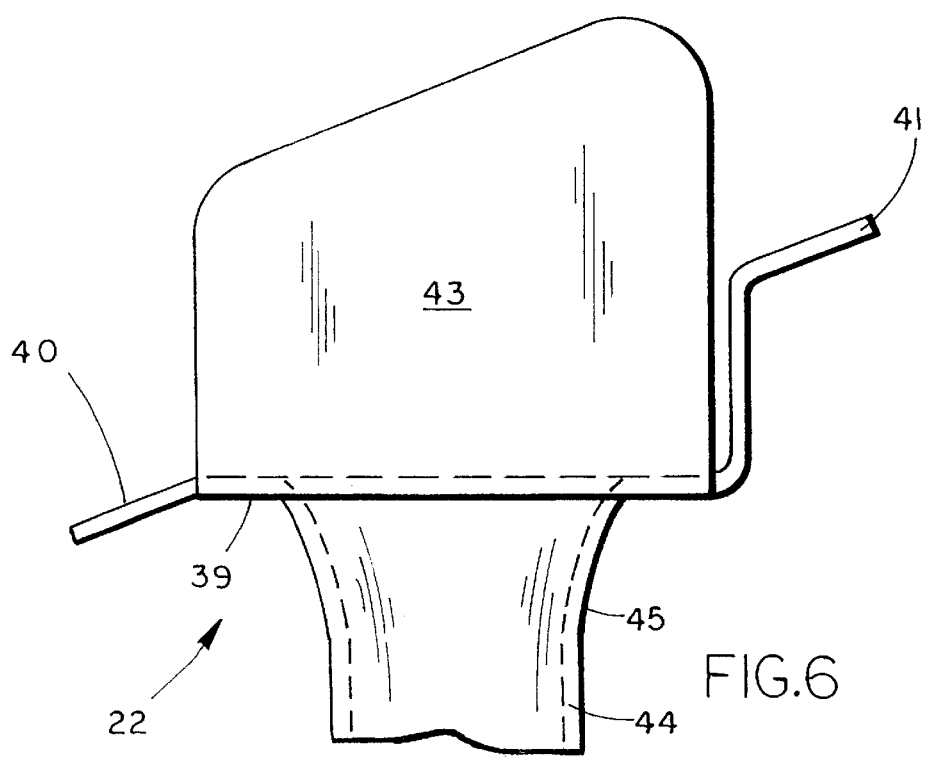

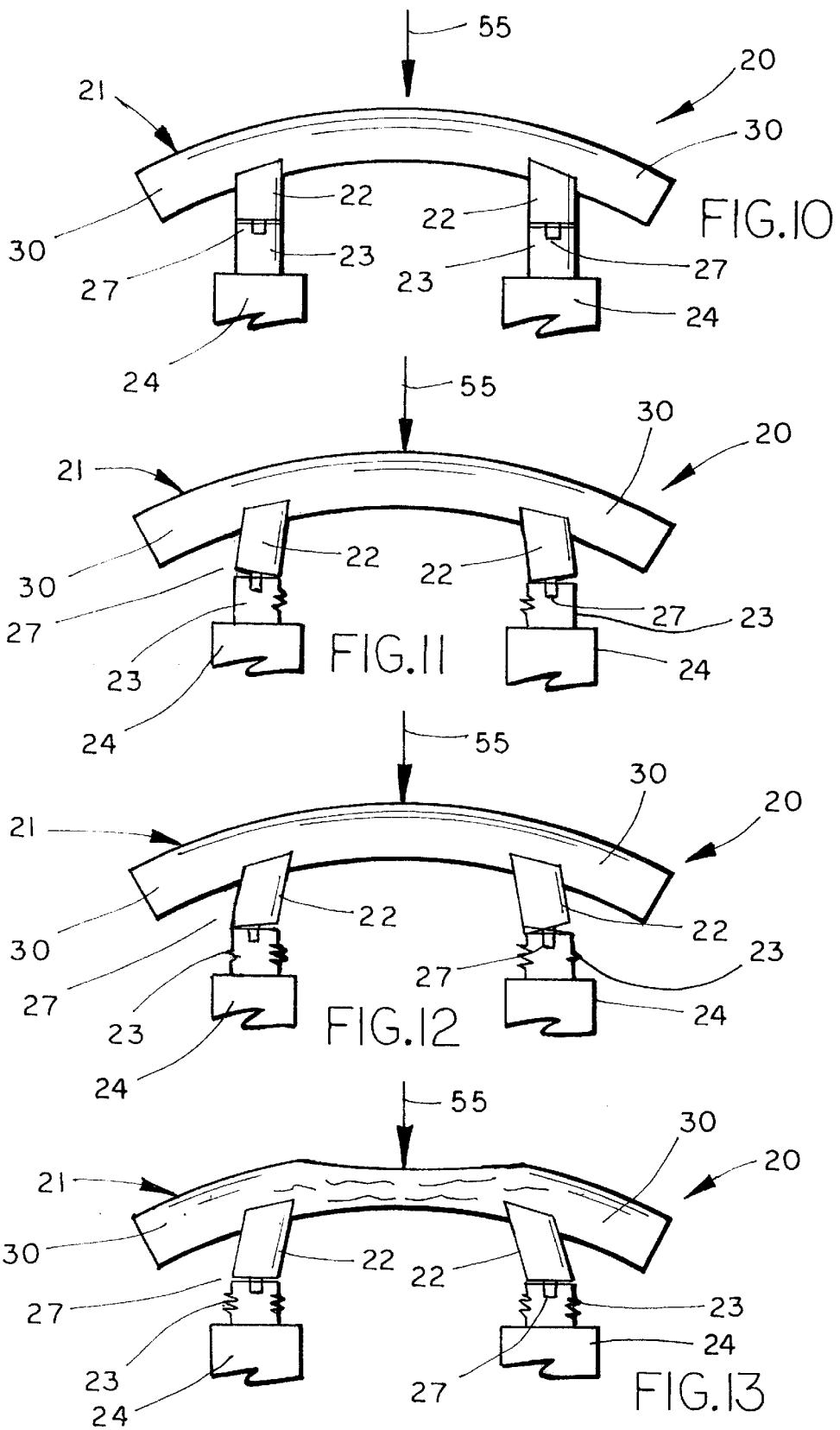

US 6,174,009 B1

BUMPER CONSTRUCTION INCLUDING SELF-ORIENTING SUPPORT TOWERS PROVIDING CONSISTENT ENERGY ABSORPTION ON IMPACT

BACKGROUND OF THE INVENTION

The present invention concerns vehicle bumper constructions adapted to provide a consistent front (or rear) impact strength and energy absorption, even where the impact forces are angled relative to a longitudinal centerline of a vehicle. In particular, the present vehicle bumper construction is adapted to provide a more consistent energy absorption during catastrophic front impact, despite the angle or location of engagement by the colliding object.

Vehicle bumpers are designed to withstand considerable impact forces and further, where the impact is severe enough to cause damage, are constructed to absorb energy to reduce damage to the vehicle. An important part of the bumper construction includes the vehicle attachment towers that are used to support the bumpers on the vehicle frame. A problem is that the impact forces generated during a vehicle crash are not always centered on the bumper, and further are not always parallel a longitudinal centerline of the vehicle. When imbalanced and off-centered impact forces occur, there is a risk that the attachment towers that support the bumper on the vehicle frame may distort in a "parallelogram" like fashion instead of crushing like an accordion. A parallelogram-like collapse is undesirable, since it typically absorbs much less energy than an accordion-like collapse. The reason is because in a parallelogram-like collapse, the tower material bends only at opposing ends of the tower (i.e., only bends at a front end near the bumper and at a rear end adjacent the vehicle attachment). Contrastingly, in an accordion-like collapse, the tower material bends and crumples along multiple locations including locations between the ends, with each of the bending locations absorbing energy from the crash. It is undesirable to have a low energy absorption because an important purpose of the bumper system is to absorb energy before the vehicle itself begins to undergo damage. Often, depressions, notches, and other features are added to towers to help ensure that the towers will collapse in an accordion-like fashion as intended. However, even when these depressions, notches, and the like are included, they do no good if the tower collapses in a parallelogram-like manner. For example, this problem can occur when the impacting object strikes the bumper at an angle, such that the forces generated cause the bumper to shift laterally at the towers. This lateral shifting results in the bumper towers being placed under shearing/torsional forces causing the towers to fail by a parallelogram-like collapse. (For example, see FIG. 2.)

Another problem is that modern vehicles are often provided with aerodynamically shaped curvilinear bumpers that wrap around a front (or rear) of a vehicle, with the bumpers having end sections that wrap rearwardly at the vehicle fenders. The above-mentioned bumper towers are attached to the vehicle frame at locations spaced inboard of ends of the bumpers. During a center impact, these bumpers can elastically flex and straighten out somewhat before permanent deformation and/or before catastrophic failure occurs, pushing the vehicle attachment towers in an outboard direction. (For example, see FIG. 1.) This also results in the towers experiencing forces that cause the towers to parallelogram instead of crush with an accordion-like motion. This in turn results in a low energy absorption, which is undesirable.

In addition to the above, there are many government standards for testing bumpers and regulations governing the minimum strength required. Regulating governmental agencies (and also insurance companies) are continuing to improve the test standards and requirements, so that the tests more accurately represent the real world forces that result during a vehicle crash. Further, there are some tests now under consideration that will require improved bumper strength during angled and/or corner impact. The net result is that improved bumper constructions are needed to pass these bumper tests, both in terms of improved load bearing capabilities and also in terms of consistency of energy absorption. Bumper constructions are already very expensive, and it is undesirable in the highly competitive industry of automobile and vehicle manufacture to add even more cost and weight to bumper systems.

Therefore, an improved bumper construction is desired solving the aforementioned problems and providing the aforementioned advantages.

SUMMARY OF THE PRESENT INVENTION

In one aspect of the present invention, a bumper system for a vehicle includes a bumper beam including a pair of spaced-apart brackets, and a pair of towers configured to attach to the brackets and to support the bumper beam on a vehicle. A swivel connection connects each tower to an associated one of the brackets. The swivel connection includes a protruding section that is located on one of the bracket and the tower, and a socket is formed on the other of the bracket and the tower for receiving the protruding section, with the protruding section and the socket operably engaging and retained together in a manner causing the tower to self-orient toward the bracket during a catastrophic impact of the bumper beam despite angled and unbalanced impact forces.

These and other aspects, objects, and advantages of the present invention will be further understood by a person of ordinary skill in this art upon study of the attached specification, claims, and appended drawings.

DESCRIPTION OF THE DRAWINGS

FIG. 1 is a schematic top view of a prior art bumper having a curved shape and that is undergoing a centered front impact;

FIG. 2 is a schematic top view of a prior art bumper similar to FIG. 1 but undergoing an angled and off-center impact;

FIG. 3 is a fragmentary perspective view of an end section of a bumper embodying the present invention including a swept tubular bumper beam with brackets, and also including a vehicle attachment tower;

FIG. 4A is a view similar to FIG. 4, but showing the tubular protruding section of FIG. 4 as being flared;

FIGS. 6 and 7 are top and end views of the bumper-engaging bracket for supporting the tower shown in FIG. 4;

FIG. 10 is a schematic top view showing the bumper on a vehicle before impact;

FIG. 11 is similar to FIG. 10 but shows the bumper after initial impact by a centered impacting force, the bumper being somewhat straightened, the brackets being shifted and rotated horizontally outwardly relative to the pivotal connection at the towers such that the inboard sidewalls of the towers are in high stress (but before crushing);

FIG. 12 is similar to FIG. 11 but shows the tower self-orienting toward the bracket;

FIG. 13 is similar to FIG. 12 but shows the tower beginning to crush with an accordion-like crushing motion;

DESCRIPTION OF PRIOR ART

Figure 4:
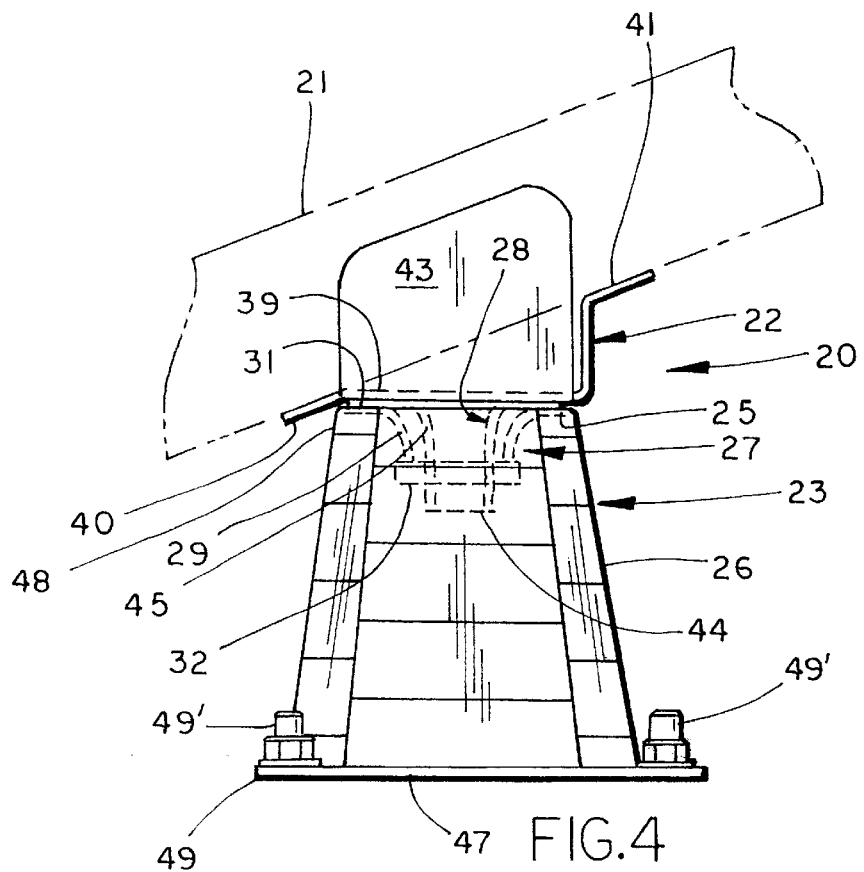
FIG. 4 is an enlarged top view of one of the bumper attachment towers shown in FIG. 3.
Figure 5:
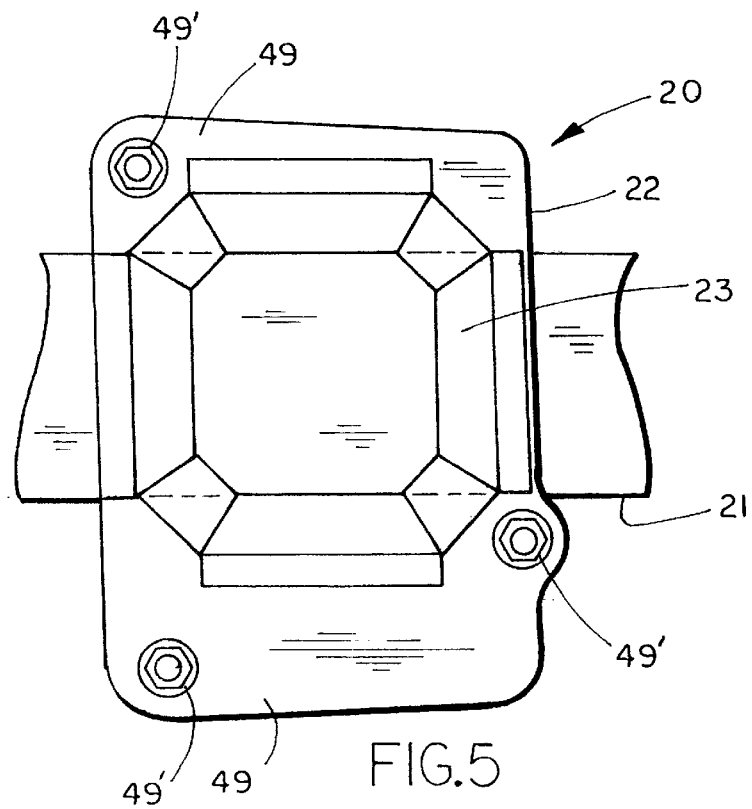
FIG. 5 is an end view of the tower shown in FIG. 4.

Some bumper systems in prior art include swept tubular bumper beams 200 (FIG. 1) supported on a vehicle frame 204 by spaced-apart towers 201. For example, see U.S. Pat. Nos. 5,092,512 and 5,625,991. A problem is that when impacted in their center, such as by a force 202, the beams 200 flex toward a straightened position (shown in dashed lines) which causes the towers 201 to shift and tilt outwardly, resulting in the towers experiencing a parallelogram-like shearing force. A similar result can occur when the prior art bumper systems are impacted at an angle by an angled force 203, as illustrated in FIG. 2. The result in both circumstances is that the towers experience torsional forces, causing the towers to want to collapse at least in part with a parallelogram-like motion, with the walls staying basically flat and bending only at their ends. Parallelogram-like collapse of a tower is undesirable, since a relatively low amount of impact energy is absorbed. It is more preferable that towers collapse with an accordion-like crushing motion, as described below, because a greater amount of energy is absorbed.

DETAILED DESCRIPTION OF PREFERRED EMBODIMENT

A bumper construction 20 (FIG. 3) for a vehicle includes a swept tubular bumper beam 21 having a pair of spaced-apart brackets 22, and a pair of towers 23 configured to attach to the brackets 22 so as to support the bumper beam 21 on a vehicle frame 24. The towers 23 each include a platform 25 configured for attachment to one of the brackets 22, and further include an elongated tubular portion 26 configured for connection to the vehicle. A swivel connection 27 (FIG. 4) connects each tower 23 to an associated bracket 22. The swivel connections 27 each include a protruding section 28 on the bracket 22 and a socket 29 on the tower 23 that operably receives the protruding section 28. The protruding section 28 and the socket 29 are configured to permit some relative horizontal and vertical rotation at the swivel connection 27, but further are designed to "drag" the tower 23 with the bracket 22 during impact and to orient the tower 23 toward the bracket 22 as the bumper construction 20 begins to crush. The swivel connection 27 further includes a resilient sheet 31 that physically separates the tower 23 from the bracket 22 a small distance, thus providing some "give" in the connection to facilitate movement in the joint during catastrophic impact. The resilient sheet 31 also prevents the interfacing flat surfaces of the tower 23 and bracket 22 from rattling and vibrating during normal operation of the vehicle. A fastener 32 compresses the resilient sheet 31 and holds each swivel connection 27 firmly together to prevent undesired shifting and vibration in the joint until the bumper construction 20 undergoes a catastrophic impact. Preliminary testing has shown that the improved present bumper construction 20 has a reduced tendency to undergo parallelogramming during catastrophic impact.

Bumper beam 21 (FIG. 3) includes a center section and opposing end sections 30. The brackets 22 are welded in place to a rear wall of each end section 30. Beam 21 is tubular and is formed by a W-shaped front wall 34, a top wall 35, a bottom wall 36, and a rear wall 37. Top and bottom walls 35 and 36 are relatively flat and extend generally horizontally to provide maximum stiffness and strength during a front (horizontal) impact of the bumper construction 20.

The brackets 22 (FIGS. 6 and 7) each include a flat transverse wall 39. Angled flanges 40 and 41 extend from opposing sides of transverse wall 39 at an angle selected so that they lie flat against the rear wall 37 of bumper beam 21 and so that they orient the transverse wall 39 properly. Opposing flanges 42 and 43 extend onto the top and bottom walls 35 and 36 of the bumper beam 21, with the opposing flanges 42 and 43 lying against the top and bottom walls 35 and 36. The flanges 40–43 are welded in place to the bumper beam 21. The flat transverse wall 39 includes a protruding tubular section 44 that extends away from the bumper beam 21. A generous radius 45 is formed at the base of the tubular section 44 adjacent transverse wall 39. The radius forms a concave, outwardly facing, ring-shaped surface. The protruding tubular section 44, in combination with the generous radius 45, defines a member shaped to operably engage the socket 29, as discussed in greater detail below. It is contemplated that the radius 45 can have many different dimensions depending on the functional requirements of a particular bumper design but, as illustrated, the radius is equal to about 15 to 20 millimeters, which appears to be optimal for mid to heavy modem passenger vehicles of about 2500 to 4000 pounds weight.

Figure 9:
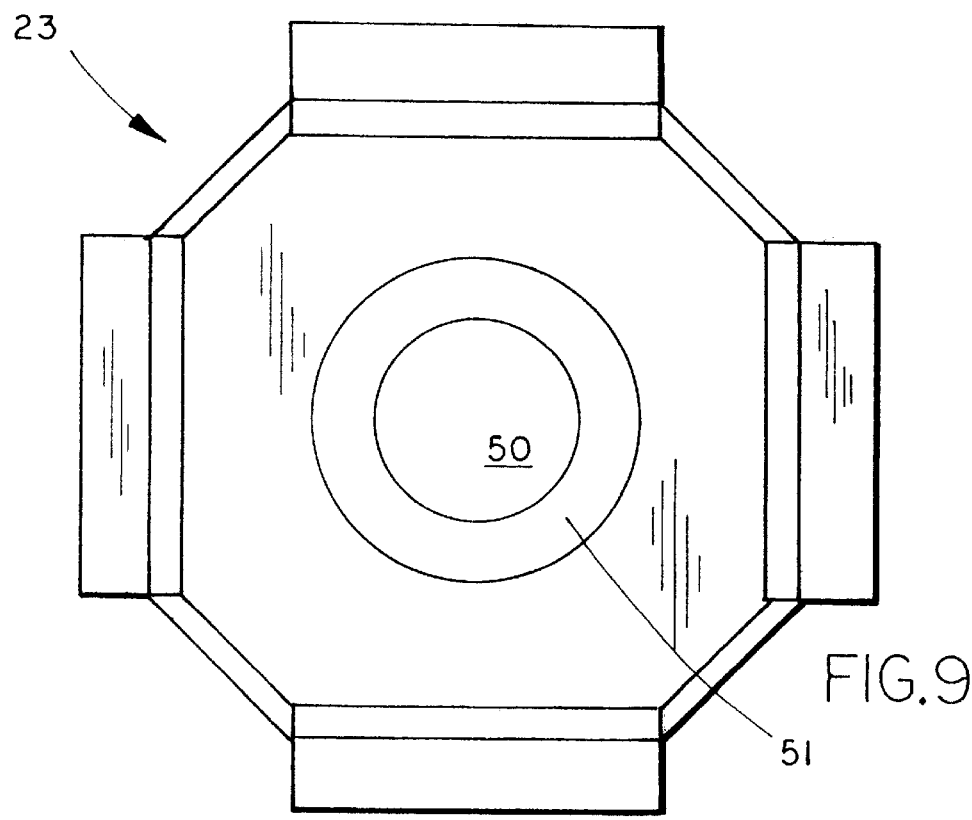
FIGS. 8 and 9 are top and end views of the tower shown in FIG. 4.
Figure 8:
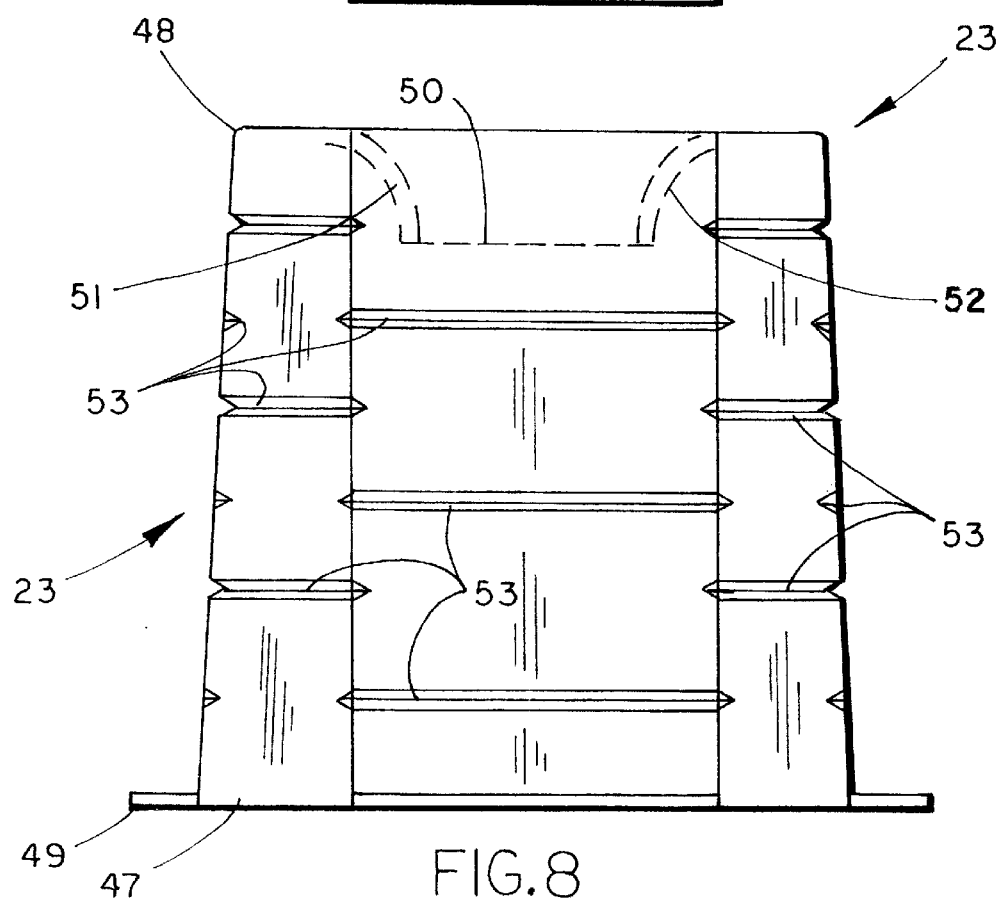
Figure 14:
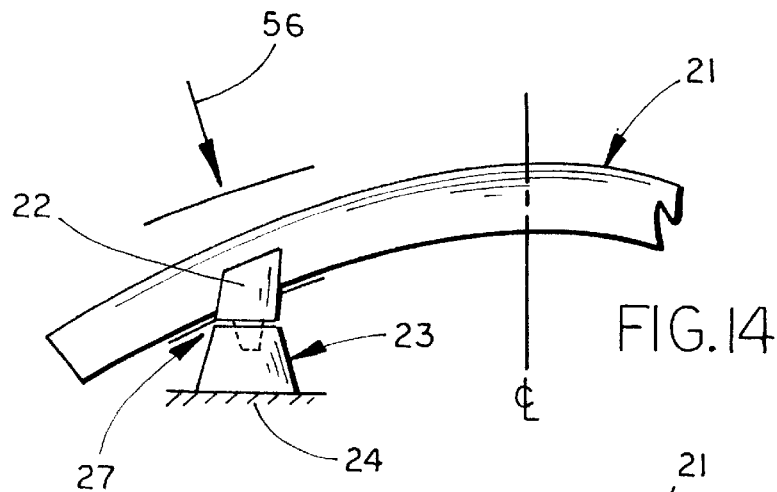
FIGS. 14–17 are schematic top views showing a sequence similar to FIGS. 10–13, but with an angled corner impacting force.

The illustrated tower 23 is octagonally shaped in cross section, although it is specifically contemplated that differently shaped towers can be used with the present invention. The elongated portion 26 of the illustrated towers 23 (FIGS. 8 and 9) includes a relatively larger cross-sectional size at the vehicle-engaging end 47, and a slightly smaller cross-sectional size at the bracket-engaging end 48. The walls forming the elongated portion 26 include crevice-like embossments 53 that form zones likely to crush and bend if the bumper construction 20 is impacted straight on. Attachment flanges 49 extend from elongated portion 26. The attachment flanges 49 are configured to be bolted onto the vehicle frame using screws and nuts 49'. The platform 25 is a relatively flat transverse wall formed on the bracket-engaging end 48. An aperture 50 is defined in a center of the platform 25 by marginal material 51. The base of the marginal material 51 is generously radiused with a radius 52 slightly smaller than the radius 45 on the protruding tubular section 44 of the bracket 22. The radiused surface forms an inwardly facing, ring-shaped surface adapted to operably mate with the radiused surface of radius 45. Further, the size of the aperture 50 is somewhat larger than the outer diameter of the protruding tubular section 44 to permit assembly. This also allows the material of the two radii 45 and 52 to "loosely" engage each other to provide angular flexibility in the joint. Specifically, the interfacing surfaces of radii 45 and 52 rotatingly pivotally engage each other, and permit multi-axial movement in a horizontal plane (see FIGS. 10–13 and also FIGS. 14–17), or in a vertical plane (see FIGS. 18–21), or any combination thereof. This, in combination with the flat surface of tower 23 and bracket 22 on each side of resilient sheet 31 and the captured protruding tubular section 44, causes the towers 23 to self-orient toward the brackets 22 during a crash. In turn, this self-orienting feature causes the tower 23 to crush with an accordion-like motion (see FIGS. 13, 17, and 21) rather than a parallelogram-like motion (see FIGS. 1 and 2).

As noted above, the swivel connection 27 includes the socket 29 on the tower 23 (FIG. 4), and further includes the protruding section 28 on the bracket 22. The swivel connection 27 further includes a fastener 32 designed to hold the bracket 22 to the tower 23. It is contemplated that the fastener 32 can be many different designs or things. In testing, a hex nut was used as the fastener 32 and was threaded onto an exterior surface of the protruding tubular section 44. It is contemplated, for example, that the hex nut could be replaced by flaring an end of the protruding tubular section 44 to form an outwardly cascading flared flange 32' (FIG. 4A) that engages an edge/end of the marginal material 51 on bracket 22 forming the aperture 50.

The illustrated bracket 22 and tower 23 are designed to be held apart by about 1 to 2 millimeters. This is accomplished by the resilient sheet 31. The resilient sheet 31 prevents the swivel connection 27 from making an unacceptable amount of vibration and noise when the vehicle is traveling along a road during normal vehicle operation, yet permits the swivel connection 27 to have a maximum flexibility to self-orient. It is contemplated that the resilient sheet 31 can be made from many different elastic and deformable materials, such as rubber, viscous substances, and the like. During collapse, the resilient material 31 simply is squeezed out of the swivel connection 27.

Figure 15:
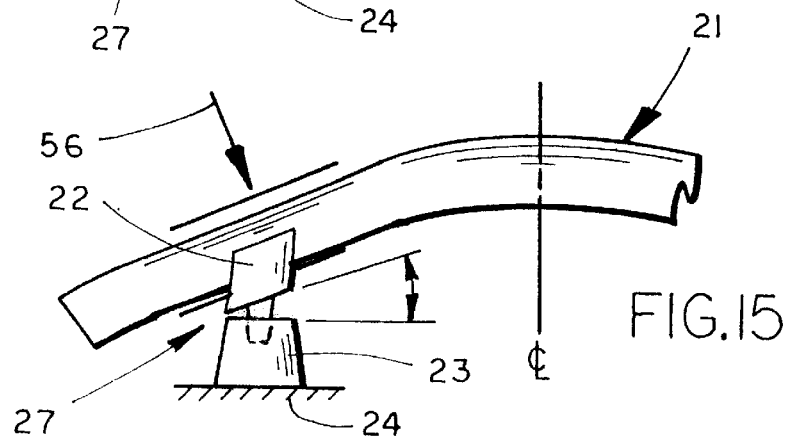
Figure 16:
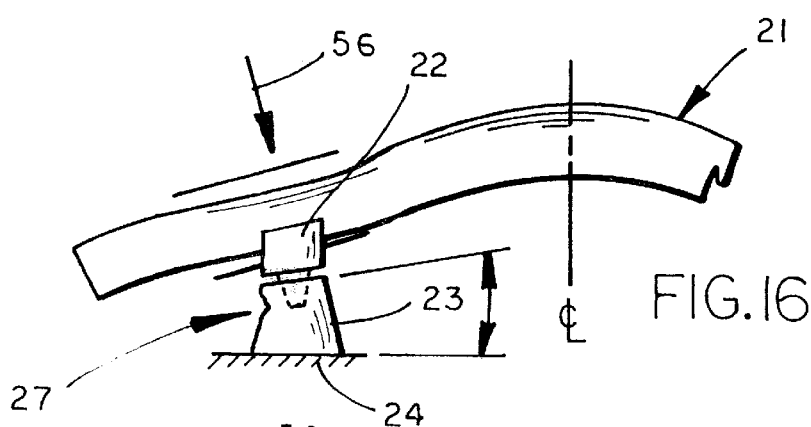
Figure 17:
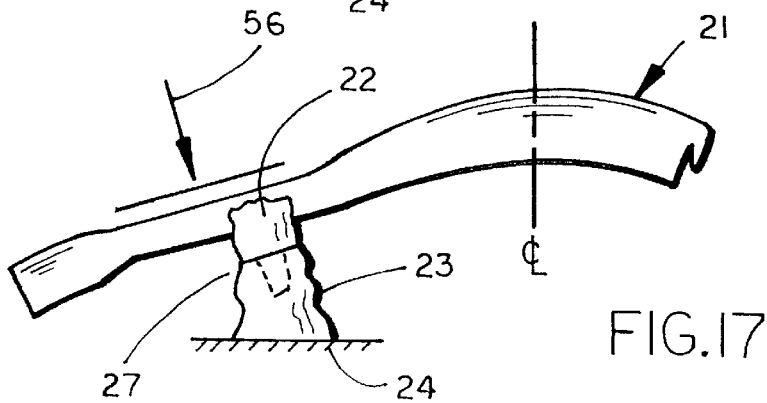
Figures 18, 19, 20, 21:
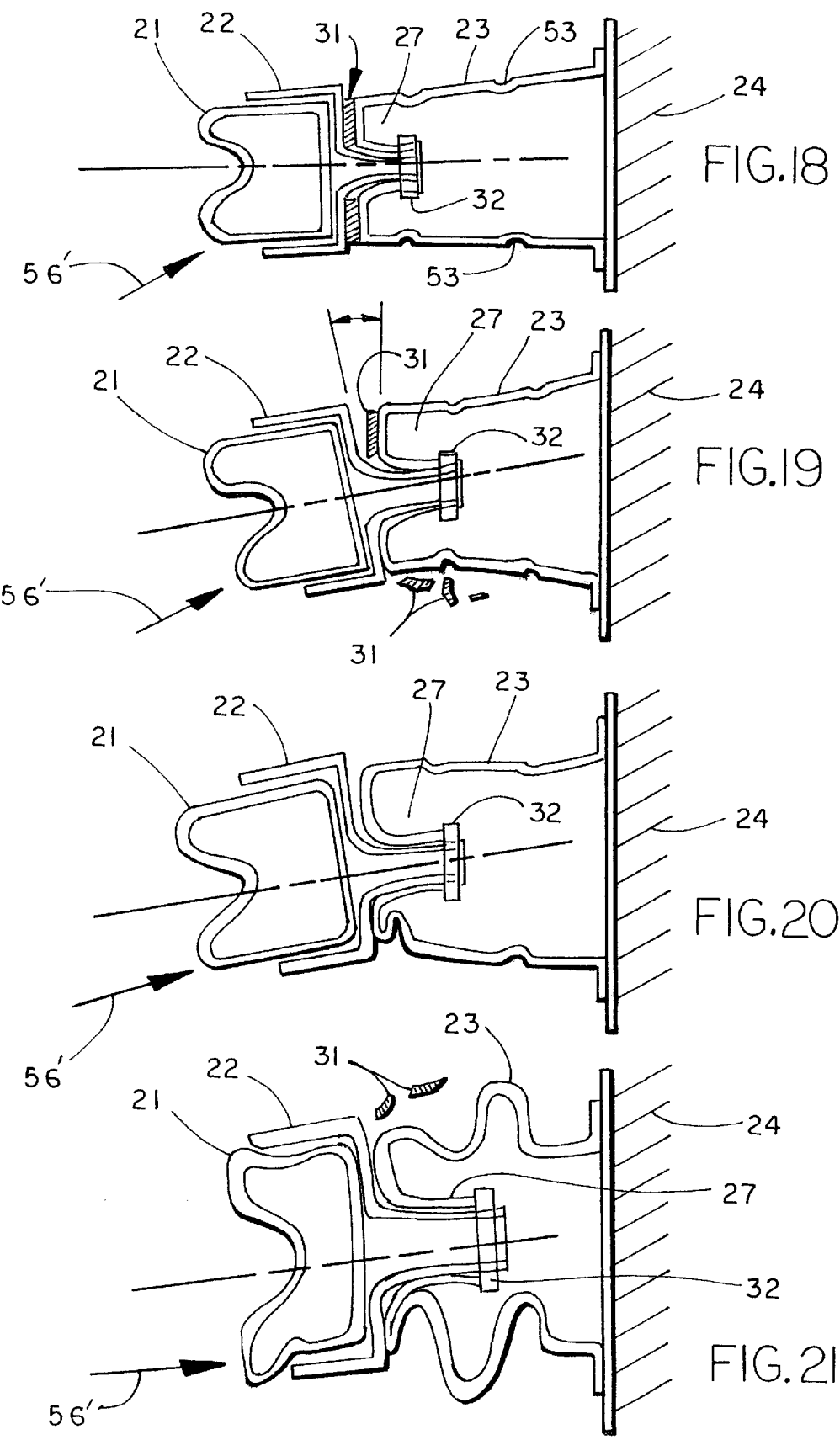
FIGS. 18–21 are cross-sectional views through one of the towers illustrating a sequence similar to FIGS. 10–13, respectively, but showing an impacting force that strikes upwardly at a bottom of the bumper beam.

In operation, when an object impacts the bumper construction 20 in a longitudinal direction 55 (FIGS. 10–13) or in an angled direction 56 (FIGS. 14–17) or in another direction 56' (FIGS. 18–21), the bumper beam 21 flexes and deflects to absorb an initial amount of energy (FIGS. 11, 15, and 19). As the platform 25 of the tower 23 engages the flat transverse wall 39 of the bracket 22, a relatively high amount of stress is transmitted to either the inboard wall (see FIG. 11) or outboard wall (see FIG. 15) or other wall (see FIG. 19) of the tower 23. The protruding section 28 operably engages the socket 29 in a manner that, in combination with the fastener 32, holds the swivel connection 27 together. When the impact reaches a stage where the bumper beam 21 has flexed a maximum amount (FIGS. 12, 16, and 20), the swivel connection 27 has drawn the tower 23 into alignment with bracket 22. Since the tower 23 is aligned with the direction of impact, tower 23 crushes with its sidewalls deforming at least in the areas of the embossments 53, thus providing a maximum amount of energy absorption. Thereafter, the bumper beam 21 further collapses (FIGS. 13, 17, and 21). The material forming the radii 45 and 52 facilitate the tower 23 self-orienting on the brackets 22, such that the platform 25 and the transverse wall 39 engage in a relatively flat manner. The net result is that the tower 23 orients toward the line of impact so that it receives a relatively longitudinally compressive force that causes it to crush and collapse in an accordion-like manner (FIG. 13). The energy absorption of the accordion-like crushing of the tower 23 is significantly higher than the energy absorption of a parallelogram-like collapse of the tower 23.

The concept of a three-stage collapse of the present bumper construction is believed to be an important contributor to the reliability and consistency of the impact strength of the present invention. In the three-stage collapse, the bumper beam initially deforms, and then the tower crushes, and then the bumper beam undergoes final collapse. This is believed to provide optimal energy absorption, with all materials optimally performing their function. Notably, it is contemplated that the present inventive construction will work using any rigid material for construction, such as high-strength steel, aluminum, and even composites or plastics.

It will become apparent to a person of ordinary skill that modifications are possible while still staying within the spirit and scope of the present invention. Accordingly, such modifications are intended to be covered by and are intended to be within the scope of the claims, unless these claims by their language require otherwise.

The invention claimed is:

1. A bumper construction for a vehicle comprising:
    a bumper beam including a pair of spaced-apart brackets;
    a pair of towers configured to attach and support the bumper beam on the vehicle; and
    a swivel connection connecting each tower to an associated one of the brackets, the swivel connection including a protruding section on one of the bracket and the tower, and a socket on the other of the bracket and the tower that operably receives the protruding section, the protruding section and the socket operably engaging each other and retained together in a manner causing the tower to self-orient toward the bracket so that the tower crushes as designed during a catastrophic impact of the bumper beam, despite angled and unbalanced impact forces;
    wherein the protruding section is located on the bracket and the socket is located on the tower;
    the protruding section includes first marginal material defining a concave, outwardly facing radiused surface, and wherein the socket is on the platform of the tower and includes second marginal material defining a mating, convex, inwardly facing radiused surface shaped to mateably engage the outwardly facing radiused surface;
    the protruding section includes a tubular section; and
    the bracket includes a flat transverse wall, and wherein the first marginal material extends around and is integrally formed from the transverse wall.

2. The bumper construction defined in claim 1 wherein the protruding section is tubular and extends in a longitudinal direction defined by the tower.

3. The bumper construction defined in claim 2 including a fastener securing the swivel connection together.

4. The bumper construction defined in claim 3 wherein the fastener engages an end of the protruding section.

5. The bumper construction defined in claim 1 wherein the connection includes resilient material physically spacing the brackets from the towers in a longitudinal direction defined by the towers.

6. The bumper construction defined in claim 5 wherein the resilient material comprises a rubber sheet.

7. The bumper construction defined in claim 1 wherein the protruding section includes a radiused base that mateably engages the socket, and wherein the protruding section further includes a flared tube end that secures the protruding section in the socket.

8. The bumper construction defined in claim 1 wherein the connection includes a fastener that securely holds the protruding section in operative contact with the socket.

9. The bumper construction defined in claim 1 wherein the bracket includes opposing lateral flanges that engage and are welded to a rear wall of the bumper beam, and still further includes opposing top and bottom flanges that engage and are welded to top and bottom walls, respectively, of the bumper beam.

10. A bumper construction for a vehicle comprising:
a bumper beam including a pair of spaced-apart brackets;
a pair of towers configured to attach and support the bumper beam on the vehicle; and
a swivel connection securing each one of the towers to an associated one of the brackets, the swivel connections each including a fastener holding the respective swivel connections together, and the swivel connections further including non-planar surfaces configured to engage and orient the respective towers toward an impacting force during impact of the vehicle.

11. The bumper construction defined in claim 10 wherein the bracket includes a protruding section having a first radiused region, and wherein the tower includes a socket having a second radiused region shaped to mateably engage the first radiused region.

12. The bumper construction defined in claim 11 wherein the protruding section includes a tubular section.

13. The bumper construction defined in claim 10 including a resilient material physically spacing the brackets from the towers in a longitudinal direction defined by the towers.

14. The bumper construction defined in claim 13 wherein the resilient material comprises a resilient compressible sheet.

15. The bumper construction defined in claim 10 wherein the bracket includes opposing lateral flanges that engage and are welded to a rear wall of the bumper beam, and still further includes opposing top and bottom flanges that engage and are welded to top and bottom walls, respectively, of the bumper beam.

16. The bumper construction defined in claim 10 wherein the swivel connection is constructed to orient the respective towers both vertically and horizontally toward a line of impact.

17. A bumper construction for a vehicle comprising:
a bumper beam including a pair of spaced-apart brackets;
a pair of towers configured to attach and support the bumper beam on the vehicle; and
a swivel connection connecting each tower to an associated one of the brackets, the swivel connection including a protruding section on one of the bracket and the tower, and a socket on the other of the bracket and the tower that operably receives the protruding section, the protruding section and the socket operably engaging each other and retained together in a manner causing the tower to self-orient toward the bracket so that the tower crushes as designed during a catastrophic impact of the bumper beam, despite angled and unbalanced impact forces;
wherein the connection includes resilient material physically spacing the brackets from the towers in a longitudinal direction defined by the towers.

18. The bumper construction defined in claim 17 wherein the resilient material comprises a rubber sheet.

19. The bumper construction defined in claim 17 wherein the protruding section is tubular and extends in a longitudinal direction defined by the tower.

20. The bumper construction defined in claim 17 including a fastener securing the swivel connection together.

21. The bumper construction defined in claim 17 wherein the protruding section includes a radiused base that mateably engages the socket, and wherein the protruding section further includes a flared tube end that secures the protruding section in the socket.

22. A bumper construction for a vehicle comprising:
a bumper beam including a pair of spaced-apart brackets;
a pair of towers configured to attach and support the bumper beam on the vehicle; and
a swivel connection connecting each tower to an associated one of the brackets, the swivel connection including a protruding section on one of the bracket and the tower, and a socket on the other of the bracket and the tower that operably receives the protruding section, the protruding section and the socket operably engaging each other and retained together in a manner causing the tower to self-orient toward the bracket so that the tower crushes as designed during a catastrophic impact of the bumper beam, despite angled and unbalanced impact forces;
wherein the protruding section includes first marginal material defining a concave, outwardly facing radius surface;
wherein the bracket includes a flat transverse wall; and
wherein the first marginal material extends around and is integrally formed from the transverse wall.

23. A bumper construction for a vehicle comprising:
a bumper beam including a pair of spaced-apart brackets;
a pair of towers configured to attach and support the bumper beam on the vehicle; and
a swivel connection connecting each tower to an associated one of the brackets, the swivel connection including a protruding section on one of the bracket and the tower, and a socket on the other of the bracket and the tower that operably receives the protruding section, the protruding section and the socket operably engaging each other and retained together in a manner causing the tower to self-orient toward the bracket so that the tower crushes as designed during a catastrophic impact of the bumper beam, despite angled and unbalanced impact forces;
wherein the protruding section is located on the bracket and the socket is located on the tower; and
wherein the protruding section includes first marginal material defining a concave, outwardly facing radiused surface, and wherein the socket is on the platform of the tower and includes second marginal material defining a mating, convex, inwardly facing radiused surface shaped to mateably engage the outwardly facing radiused surface.

24. The bumper construction defined in claim 23 wherein the protruding section includes a tubular section.

25. The bumper construction defined in claim 23 wherein the protruding section is tubular and extends in a longitudinal direction defined by the tower.

26. The bumper construction defined in claim 23 wherein the protruding section includes a radiused base that mateably engages the socket, and wherein the protruding section further includes a flared tube end that secures the protruding section in the socket.

27. The bumper construction defined in claim 23 wherein the connection includes a fastener that securely holds the protruding section in operative contact with the socket.

28. A bumper construction for a vehicle comprising:
a bumper beam including a pair of spaced-apart brackets;
a pair of towers configured to attach and support the bumper beam on a vehicle; and
a swivel connection securing each one of the towers to an associated one of the brackets, the swivel connections each including a fastener holding the respective swivel connections together;
wherein the towers are adapted to adjust both vertically and horizontally toward a line of impact.

* * * * *

UNITED STATES PATENT AND TRADEMARK OFFICE
CERTIFICATE OF CORRECTION

PATENT NO. : 6,174,009 B1　　　　　　　　　　　　　　　　　　　　Page 1 of 1
DATED : January 16, 2001
INVENTOR(S) : R. Clayton McKeon It is certified that error appears in the above-identified patent and that said Letters Patent is hereby corrected as shown below:

<u>Column 4,</u>
Line 37; "modem" should be -- modern --.

Signed and Sealed this

Twenty-fifth Day of September, 2001

Attest:

*Nicholas P. Godici*

NICHOLAS P. GODICI
*Attesting Officer*　　　*Acting Director of the United States Patent and Trademark Office*